Nov. 17, 1942.    C. C. ABBOTT    2,302,284
SAFETY GAS PRESSURE REGULATOR
Filed Feb. 20, 1940    2 Sheets-Sheet 1
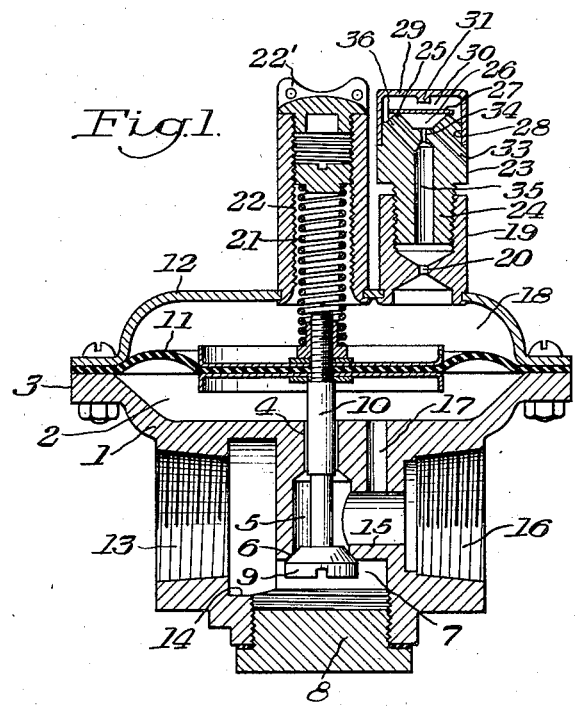
INVENTOR
Corwin C. Abbott.
BY
Lewis D. Koningsford
ATTORNEY Nov. 17, 1942.  C. C. ABBOTT  2,302,284
SAFETY GAS PRESSURE REGULATOR
Filed Feb. 20, 1940  2 Sheets-Sheet 2
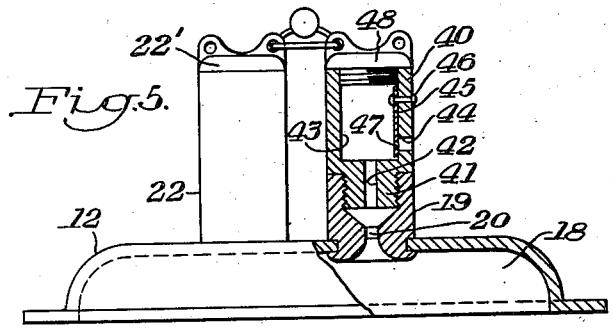
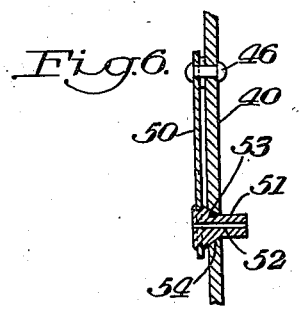
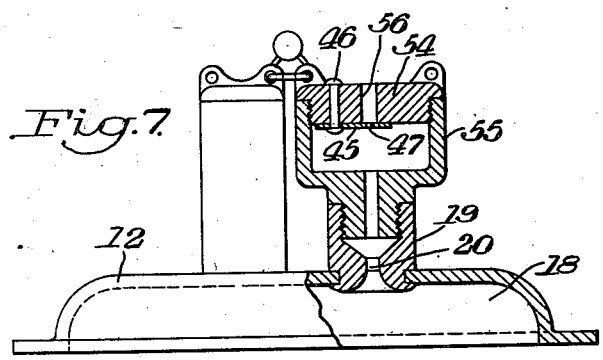
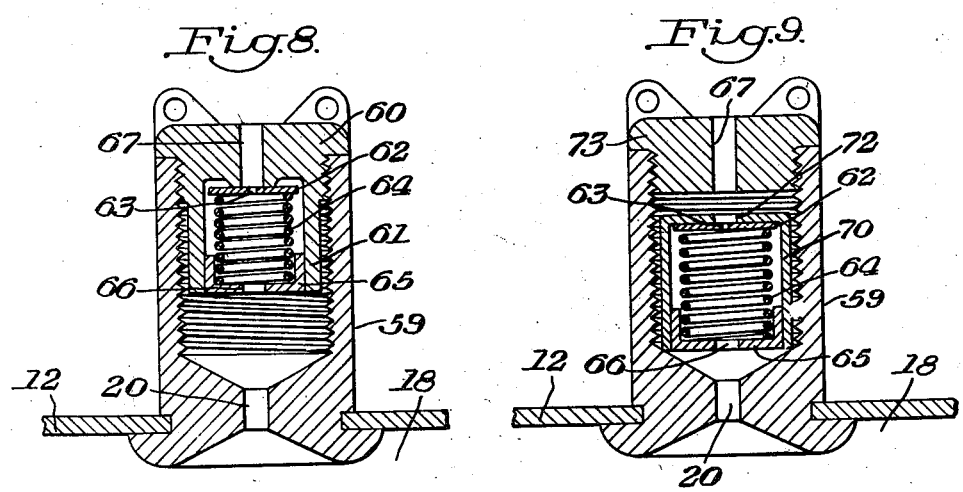
INVENTOR
Corwin C. Abbott.
BY
Lewis D. Konigsford
ATTORNEY Patented Nov. 17, 1942

2,302,284

UNITED STATES PATENT OFFICE 2,302,284

SAFETY GAS PRESSURE REGULATOR

Corwin C. Abbott, Pittsburgh, Pa., assignor to Pittsburgh Equitable Meter Company, Pittsburgh, Pa., a corporation of Pennsylvania Application February 20, 1940, Serial No. 319,874

4 Claims. (Cl. 137—111)

The present invention relates to fluid pressure regulators, and relates particularly to regulators of that type having means to prevent or limit leakage of gas to the exterior in case of leakage occurring through the regulator diaphragm.

In gas pressure regulators, particularly when used in a confined space such as on a gas range in a kitchen, a leak in the diaphragm allowing gas to escape through the vent may create a fire or explosion hazard. It has been found that a leak not exceeding about one cubic foot per hour for natural gas is not enough to provide a dangerous accumulation of gas in a kitchen as ordinarily ventilated. However, if the operating vent or orifice is made so small as to limit the flow therethrough to a permissible rate, the regulator ceases to respond to changes in outlet pressure, or responds too slowly to be practicable. On a gas range employing a pilot light, it has been found that when the demand for gas increases suddenly, as for example, when the broiler or oven burner is turned on, the regulator diaphragm should respond immediately to maintain the outlet pressure to prevent snuffing out of the pilot light. However, on the other hand, when the broiler burner is suddenly turned off, it is not objectionable if the outlet pressure builds up for a short time, as this results merely in a larger pilot light flame until the pressure returns to normal.

According to the present invention, I provide a regulator having two vent orifices for the atmospheric pressure chamber, one of the vent orifices being sufficiently small to prevent flow of gas greater than a safe rate therethrough, and the other vent being large enough to allow the regulator diaphragm to respond quickly to a drop in pressure, and I control said orifices by a pressure or flow responsive valve member which closes the larger orifice when the pressure in the atmospheric pressure chamber increases. An orifice of about one hundred thirty five ten thousandths (0.0135) diameter is sufficiently small to prevent a dangerous flow of gas therethrough. The continued escape of gas through this small orifice acts as a warning sign that the regulator is not functioning properly.

In the preferred embodiment of the invention, I provide an attachment for the atmospheric vent of a pressure regulator having a safety orifice of sufficiently small size and an operating orifice of larger size, and control these orifices by a valve of very light weight, so as to be responsive to the small pressure differences encountered in operation of the regulator. I have found a valve composed of a thin disk of polished mica, especially suitable for this purpose, although the invention is not intended to be limited thereto.

Accordingly, it is an object of the invention to provide a gas pressure regulator of the safety type, which is inexpensive to manufacture and is of simple construction.

Still another object is the provision of a safety regulator in which the safety vent is controlled by a light weight freely moving valve which will not deteriorate under operating conditions.

A further object is the provision of a safety device capable of attachment to a standard type gas pressure regulator.

The invention will be described in greater detail in the following specification taken in connection with the accompanying drawings, wherein is shown a preferred embodiment of the invention by way of example, and wherein:

Figure 1 is a vertical sectional view of a preferred embodiment of the invention applied to a gas pressure regulator, Figure 2 is an enlarged view of a detail showing the valve in open position, Figure 3 is an enlarged view of a detail showing the valve in closed position, Figure 4 is a fragmentary view of a modification, Figure 5 is a fragmentary view of a further modificatoin with parts in section, Figure 6 is a fragmentary sectional view of another modification, Figure 7 is a fragmentary view partly in section of another modification, Figure 8 is a view in section of another modification, and Figure 9 is a view in section of a further modification.

Referring to the drawings, the body 1, which may be cast in a single piece with a depression 2 and a flange 3 formed thereon, is bored to provide a valve stem guide 4, an expansion chamber 5, a tapered valve opening 6 and a threaded access hole 7 adapted to be closed by a plug 8. A valve member 9 suitably secured to a valve stem 10, is fastened in any suitable manner to a diaphragm 11 suitably clamped at its periphery between the cover 12 and the body 1 to provide a control chamber 2. The body is bored and threaded to provide an inlet 13 which is undercut at 14 so as to communicate with valve bore 6 by means of the access hole 7, and a reduced outlet passageway 15 is bored to connect with the expansion chamber 5 and the regulator outlet 16. Control chamber 2 communicates with the expansion chamber 5 by means of the clearance provided between the bore 4 and valve stem 10 and connects with the reduced outlet passage 15 by a bore 17. The area of bore 17 preferably is at least three times the area of the clearance space between stem 10 and bore 4. The chamber 18 formed between the cover 12 and the diaphragm 11 communicates with the atmosphere through an orifice 20 of any suitable dimension located in a vent tube 19 connected to the cover 12. The diaphragm 11 is loaded by an adjustable spring 21 extending into spring tube 22, the end of which is sealed by a threaded spring tube cap 22'. Any other suitable diaphragm loading means may be employed.

From the description so far pursued, it will be apparent that during operation of the regulator the diaphragm 11 moves up or down so as to cause valve 9 to open or close the valve orifice 6 to maintain the outlet pressure constant, this movement of the diaphragm causing a change of volume of the vented chamber 18. When the volume of chamber 18 is reduced by the diaphragm moving upwardly, air is forced from chamber 18 through vent 20 to the atmosphere, and when the volume of chamber 18 is increased by the diaphragm moving downwardly, air is sucked into chamber 18 through the vent 20. Vent 20 preferably is of such size as to provide the proper degree of damping action on the diaphragm to prevent undesired pulsations of the regulator valve.

The vent tube 19 has a threaded bore, and a hexagonal body 23 having a threaded extension 24 is received therein. The body 23 is machined to provide a valve edge or seat 25 which is smoothly polished, and preferably is rounded. A central recess 26 is provided within valve edge 25 and a valve plate or member 27 is adapted to seat on valve edge 25 and close the end of recess 26. Body 23 has a reduced portion 28 which receives a circular cap 29 with a pressed tight fit, thus providing a chamber 30 between the end of body 23 and cap 29. Cap 29 also serves as a guide for the disc may be provided. A boss 31 on the cap is provided for a purpose presently to be described.

Recess 26 communicates with the atmosphere through a passage 33 of any suitable area, and thus is maintained at atmospheric pressure. In the preferred embodiment this passage is about the same diameter as vent 20 and may be about 3/64 inch in diameter. Recess 26 also communicates with vented chamber 18 through a restricted safety vent or restricted orifice 34 of such area that flow of gas therethrough at the usual pressure of the gas going through the regulator inlet cannot exceed a safe amount, for example, about one-half cubic foot per hour. That is, an increase in pressure in the vent chamber reduces the flow from the chamber to a predetermined amount. In a preferred embodiment, vent 34 is about .0135 inch in diameter. That is, vent 34 connects with an enlarged duct or passageway 35 provided in the body, which in turn connects with vent orifice 20 opening into chamber 18. Chamber 30 connects with duct 35, and hence with vented chamber 18 by means of a passage 36 which may be of substantially the same area as passage 33.

The operation of the invention now will be described. Assuming a relatively small flow through the regulator, the valve 9 will be slightly open and diaphragm 11 will be near its uppermost position. Recess 26 communicates with the atmosphere by means of duct 33, and also connects with chamber 18 by means of orifice 34, duct 35 and vent 20, so that chamber 18 will be at atmospheric pressure. Recess 26 also connects with chamber 30 by means of orifice 34 and ducts 35 and 36, so that chamber 30 will be at the same pressure as recess 26. As the pressure in recess 26 and 30 are equal, valve plate 27 will be seated by its own weight on valve edge 25, as shown in Figure 3. Should the flow through the regulator suddenly increase, as for example, by the opening of a burner on the gas range, the pressure in outlet 16 will decrease and diaphragm 11 will immediately descend to open valve 9 to maintain the outlet pressure. As diaphragm 11 moves down, it tends to create a rarefaction in chamber 18 and passage 35 which is immediately communicated to closed chamber 30 through large passage 36, but is not communicated as rapidly to recess 26 because of the small size of vent 34, the large size of vent 33 maintaining atmospheric pressure in recess 26. The difference in pressure in chamber 30 and recess 26 will lift valve plate 27 off valve edge 25, thus allowing air to flow rapidly into chamber 18 through large passage 36 as well as through small vent 34, this flow being sufficiently rapid to allow the diaphragm 11 to move rapidly enough to maintain the required pressure in the outlet 16. The boss 31 prevents the valve disc 27 from being forced flat against the top of chamber 30 and held there by moisture, vacuum caused by the flow of gas, or by any other cause. As soon as the pressures in chambers 30 and 26 become substantially equal the disc 27 again returns to its seat 25.

Now, assuming a relatively large flow through the regulator, the valve 9 will be wide open, diaphragm 11 will be near its extreme downward position, and valve plate 27 will be seated by its own weight on valve edge 25. Now, if the flow is suddenly decreased, the pressure builds up in outlet 16, thus causing diaphragm 11 to rise rapidly to tend to close valve 9 so as to maintain a constant pressure in the outlet. As diaphragm 11 rises, it tends to compress the air in chamber 18, and thus creates a pressure slightly above atmospheric which is immediately communicated to closed chamber 30 through large passage 36 but is not communicated as rapidly to recess 26 because of the small size of vent 34. The pressure in chamber 30 will, therefore, hold valve plate 27 on its seat, while the pressure in chamber 18 slowly escapes through vent 20 and vent 34 to the atmosphere by large passage 33. The slow escape of air from chamber 18 through vent 34 will cause sluggish action of diaphragm 11 and slow closing of valve 9, resulting in a slight building up of pressure in outlet 16, which, however, is of no material disadvantage on gas ranges or other installations having a pilot flame, as it will merely increase the size of the pilot flame for a short interval. However, slow opening of valve 9 is undesirable because the pressure is liable to fall in outlet 16 low enough to extinguish the pilot light.

Should the diaphragm 11 be ruptured or develop a large leak, the gas will flow through the diaphragm into chamber 18 to build up a pressure therein, which, as previously explained, is transmitted more quickly to chamber 30 than to recess 26. Valve disc 27 will be held on its valve seat 25, so that gas can escape from chamber 18 only by vent 34 into recess 26 and thence to atmosphere through passage 33. Because of the small size of vent 34, the flow of gas therethrough is maintained low enough so that it creates no hazard. If the leak is large enough the pressure in chamber 18 will become equal to the pressure in chamber 2 and the valve 9 will fall wide open, thus allowing a free flow to the appliance. If desired, a second valve may be applied to the valve stem 10 to shut off flow under such conditions, substantially as shown in Figure 2 of Patent No. 2,147,850, issued February 21, 1939, to Allen D. MacLean.

In Figure 4, wherein like parts are correspondingly numbered, I have shown a modification in which vent tube 19 is omitted, the body 23 being directly secured to the regulator cover 12 in any suitable manner, as by swaging the end thereof. This modification operates substantially as described in connection with Figures 1 to 3, and need not be described in detail.

In the modifications shown in Figures 5 to 9, like parts are correspondingly numbered. Referring to Figure 5, the cover 12 has the usual spring tube 22 closed by a cap 22' and a vent tube 19 which is bored and internally threaded and provides a vent 20 connected to the chamber 18 in the cover. The attachment received in vent tube 19 comprises hollow body 40 having a reduced threaded end 41 with a passage 42 therethrough of substantially the same size as vent 19 connected with the interior chamber 43 thereof. A passageway 44 of about the same size as passage 42 is provided in the wall of body 40 and is adapted to be partially closed by a light leaf spring 45, held in place by a rivet 46 or in any other suitable manner. Spring 45 has a small orifice 47 which is adapted to register with the operating orifice 44 and connects pasage 42 with passageway 44. The outer end of chamber 43 is closed by a threaded cap 48, which may be sealed to cap 22' by a suitable wire and lead seal.

In this modification, when the diaphragm 11 moves downward to increase the volume of chamber 18, the air entering orifice 44 moves the spring 45 sufficiently off its seat to allow relatively free passage of air therethrough, and the air enters chamber 18 through passages 42 and 20. When the volume of chamber 18 is reduced, the air forced through vent 20 and passage 42 urges the spring 45 against the wall of chamber 43, thus closing off orifice 44 and allowing escape of air only through the small vent 47 which is so small as to confine the flow therethrough to less than about 1 cubic foot per hour.

In the modification shown in Figure 6, a spring 50 secured to the wall of tube 40 by rivet 46 has a nozzle member 51 with a small orifice 52 therethrough. A tapered orifice 53 in the wall of the tube provides a seat adapted to be closed by the tapered portion 54 of the nozzle member 51. The nozzle may be secured to the spring 50 in any suitable manner, as by-passing the reduced interior end of the nozzle through a hole in the spring and swaging over the reduced end of the nozzle. In this modification the tapered surface of the nozzle co-operating with the tapered orifice 53, acts as a valve therefor in which orifice 53 is the operating vent and 52 is the safety vent providing a reduced predetermined flow. In this modification, when the diaphragm moves downward, the air pressure forces the nozzle 51 inwardly away from the seat, thus opening the passage 53 for air into the vent chamber, and when the vent chamber decreases in size, the pressure of air forces the nozzle against its seat, thus closing off the orifice 53 and providing escape for gas only through the small safety vent 52. The nozzle 51 extending through the wall 40 acts as an indicator to show the operating condition of the regulator.

In the modification shown in Figure 7, the cap 54 received in the modified body 55 has a hole 56 therethrough and the spring 45 with a hole 47 therethrough is held in place by rivet 46 and operates in the same manner as described in connection with Figure 5.

In Figure 8 the body 59 is closed by a cap 60 having an extension 61 within which is received a valve plate 62 having a small orifice 63 therein, and plate 62 is biased outwardly by a spring 64. The opposite end of the spring abuts a cap 65 forced into the extension 61 with a pressed fit. Cap 65 is perforated at 66 to provide a passage for the flow of air and cap 60 has an orifice 67 therein of substantially the same size as hole 66 or vent 20. In this modification, when the volume in chamber 18 increases, the flow of air depresses plate 62 to open orifice 67 and allow flow of air therethrough, through perforation 66 and vent 20 into the atmospheric chamber 18. When the volume of chamber 18 decreases, the plate 62 is forced against its seat by the spring 64 closing the orifice 67 and allowing escape of air only through the safety orifice 62. Spring 64 normally is under sufficient initial compression to hold plate 62 in this position.

In the modification shown in Figure 9 the vent tube 59 contains a cartridge comprising a cup 70 having an orifice 72 therein at one end covered by a plate 62 which is held in position by the spring 64 abutting the perforate cover 65 pressed into the cup. This modification operates in the same manner as that shown in Figure 8, the orifice 63 acting as a safety orifice and openings 67, 72, 66 and 20 being of suitable size to co-operate with vent 20 to allow relatively free flow of air therethrough.

It will be understood that in the modifications of Figures 5 to 9, wherein the closure member is perforated and is held against the operating vent by spring action, that the spring is adjusted or selected to have sufficient strength to allow relatively free movement of the closure member without interfering unduly with the operation of the regulator. In the modifications shown in Figures 1 to 4, the weight of valve plate 27 provides sufficient bias to normally hold it on its seat.

What I claim as my invention and desire to secure by United States Letters Patent is:

1. A safety attachment for gas pressure regulators comprising a body adapted to be connected to the vented chamber of a pressure regulator and having a relatively large passageway therein opening at all times to the atmosphere and terminating at its inner end in a valve seat, a valve member adapted to seat on said valve seat, a housing enclosing said valve member and providing a pressure chamber on the opposite side thereof, a passageway connecting said pressure chamber with the vented chamber, and an orifice connecting said latter passageway to the first mentioned passageway.

2. A safety attachment for gas pressure regulators comprising a body adapted to be secured to a pressure regulator casing and having a recess therein surrounded by a valve seat, a relatively large passage at all times connected to said recess to maintain said recess at atmospheric pressure, a rigid imperforate disc adapted to seat on said seat to close said recess, a housing for said disc providing a pressure chamber on the opposite side of said disc, a restricted safety vent adapted to connect said vented chamber with said recess, and a second passageway adapted to connect the pressure chamber with the vented chamber.

3. A safety attachment for a gas pressure regulator having a breather chamber comprising a body adapted to be connected thereto and having a relatively large passageway therein at all times opening to the atmosphere, the inner end of the passageway providing a seat, a valve seated on said seat, said body providing a chamber on the opposite side of said valve, a relatively large passageway in said body adapted to be connected to the breather chamber at one end and having a branch connected to the second mentioned chamber at the other end, and a restricted orifice in said body connecting said latter passageway to the first mentioned passageway.

4. A safety attachment for a gas pressure regulator having a breather chamber comprising a body adapted to be connected thereto and having a recess adjacent one end surrounded by a seating periphery, a rigid imperforate plate yieldingly seated on said periphery by its own weight, a closure for the end of said body providing a chamber on the opposite side of said plate, a relatively large passageway in said body adapted to be connected to the regulator breather chamber at one end and connected to said recess at its other end by a restricted orifice, a passageway joining said first passageway and the second mentioned chamber, and a third passageway open at all times and passing from said recess to the atmosphere.

CORWIN C. ABBOTT.